United States Patent
Pearson et al.

(10) Patent No.: US 9,194,978 B2
(45) Date of Patent: Nov. 24, 2015

(54) ELECTRONIC MARKER LOCATOR SYSTEMS AND METHODS

(71) Applicant: RADIODETECTION LTD., Bristol (GB)

(72) Inventors: Richard David Pearson, Bristol (GB); Jeffrey Richard Thompson, Cheltenham (GB); Julian Poyner, Cheshire (GB)

(73) Assignee: Radiodetection Ltd., Bristol (GB)

( * ) Notice: Subject to any disclaimer, the term of this patent is extended or adjusted under 35 U.S.C. 154(b) by 157 days.

(21) Appl. No.: 13/892,841

(22) Filed: May 13, 2013

(65) Prior Publication Data
US 2014/0333309 A1    Nov. 13, 2014

(51) Int. Cl.
*G01V 3/08* (2006.01)
*G01V 3/10* (2006.01)
*G01V 15/00* (2006.01)
*G01V 3/00* (2006.01)

(52) U.S. Cl.
CPC *G01V 15/00* (2013.01); *G01V 3/08* (2013.01); *G01V 3/083* (2013.01); *G01V 3/00* (2013.01); *G01V 3/081* (2013.01)

(58) Field of Classification Search
CPC ........... G01V 3/00; G01V 3/08; G01V 3/083; G01V 3/081; G01V 15/00
USPC .......... 324/326–329, 331–332, 343; 702/166; 343/728
See application file for complete search history.

(56) References Cited

U.S. PATENT DOCUMENTS

| 2,680,226 | A | 6/1954 | Whitehead et al. |
| 6,118,378 | A | 9/2000 | Balch et al. |
| 6,617,856 | B1 | 9/2003 | Royle et al. |
| 6,815,953 | B1 * | 11/2004 | Bigelow .................. 324/329 |
| 6,954,072 | B1 * | 10/2005 | Schlapp et al. ........... 324/329 |

(Continued)

FOREIGN PATENT DOCUMENTS

| GB | 2486219 A | 6/2012 |
| WO | 2006/037176 A1 | 4/2006 |
| WO | 2013/058984 A1 | 4/2013 |

OTHER PUBLICATIONS

Search Report issued in GB Patent Application No. 1308550.1 issued Nov. 12, 2013.

(Continued)

*Primary Examiner* — Melissa Koval
*Assistant Examiner* — Felicia Farrow
(74) *Attorney, Agent, or Firm* — Baker & Hostetler LLP (57) ABSTRACT

A locator for determining the depth of a buried electromagnetic marker includes a transmission antenna and two reception antennas. The locator has a major axis and is configured. The transmission antenna is configured to generate an oscillatory magnetic field parallel to the major axis. The first reception antenna of the two reception antennas is configured to couple with an oscillatory magnetic field parallel to the major axis emitted by the electromagnetic marker and to generate a first detected signal. The second reception antenna is displaced along the major axis from the first antenna and configured to couple with an oscillatory magnetic field parallel to the major axis emitted by the electromagnetic marker and to generate a second detected signal. The locator includes analogue to digital converters and a processor which is configured to calculate the depth of the electromagnetic marker.

20 Claims, 5 Drawing Sheets

(56) References Cited

U.S. PATENT DOCUMENTS

| | | |
|---|---|---|
| 7,741,848 B1* | 6/2010 | Olsson et al. ............... 324/326 |
| 2002/0043976 A1 | 4/2002 | Holladay et al. |
| 2004/0178794 A1 | 9/2004 | Nelson |
| 2007/0013379 A1* | 1/2007 | Staples et al. ............... 324/326 |
| 2009/0219027 A1 | 9/2009 | Morrison et al. |
| 2010/0004880 A1* | 1/2010 | Royle et al. ............... 702/57 |
| 2013/0099790 A1* | 4/2013 | Doany et al. ............... 324/326 |

OTHER PUBLICATIONS

EP Search Report issued in EP Application No. 14167779.9 dated Jun. 19, 2015.

* cited by examiner

ELECTRONIC MARKER LOCATOR SYSTEMS AND METHODS

FIELD OF THE INVENTION

Embodiments of the present invention relate to systems and methods for locating electronic markers. In particular, embodiments of the present invention relate to the estimation of the depth of buried electronic markers.

BACKGROUND

Buried electronic markers are used to indicate the location of a buried structure or utility. A buried marker is made from a circular coil that is arranged in a resonant circuit and designed to resonate at a specific frequency. An oscillatory electric current may be induced in this circuit by an externally applied pulse or pulses of magnetic flux linking the coil. The oscillatory current in the coil gives rise to an oscillatory magnetic field around the coil. The presence of this oscillatory magnetic field may be detected, allowing the position of the marker to be determined. The axis of the coil in the buried electronic marker is arranged to be oriented vertically so that the location of the buried marker may be found directly beneath the position where the magnitude of the oscillatory magnetic field is detected to be at a maximum.

The magnetic flux density at a point on the axis of a circular coil consisting of N turns of radius a carrying current i at a distance x from the center of the coil may be determined using the Biot-Savart Law. It is given by:

$$B(x) = \frac{\mu_0 Ni}{2}\left(\frac{a^2}{(x^2+a^2)^{\frac{3}{2}}}\right)$$

Where $\mu_0$ is the magnetic permeability of free space.
When $x \gg a$, this simplifies to an inverse cube law:

$$B(x) = \frac{\mu_0 Nia^2}{2x^3}$$

A known system comprises a transmitting antenna and a receiving antenna. To determine the depth of cover to a buried electronic marker, the system is operated in a first position along the axis of the circular marker coil and the magnitude of the magnetic field radiated by the marker is measured and stored. Then the system is raised above the first position by a pre-defined distance and operated in a second position along the axis of the circular marker coil and the magnitude of the magnetic field radiated by the marker is measured and stored. Knowledge of the pre-defined distance enables the depth of the marker to be estimated using the stored values.

In this case the magnetic field received by the marker is reduced when the system is in the second position, as the transmitting antenna is further away from the marker by a distance s.

Let the radius of the transmitting antenna be denoted b and the distance along the axis of the transmit antenna coil be x. The magnitude of the magnetic field at the center of the marker coil due to the ampere turns $Ni_{tx}$ in the transmit antenna coil is given by:

$$B_m(x) = \frac{\mu_0 Ni_{tx}}{2}\left(\frac{b^2}{(x^2+b^2)^{\frac{3}{2}}}\right)$$

When $x \gg b$, this becomes:

$$B_m(x) = \frac{\mu_0 Ni_{tx} b^2}{2x^3}$$

Let the distance along the axis of the circular coil from a first position of the magnetic sensor to center of the circular coil=d. Let the distance along the axis of the circular coil from the first position of the magnetic sensor to the second position of the magnetic sensor=s. The magnitude of the magnetic field re-radiated by the marker is proportional to the magnitude of the magnetic field at the center of the marker coil due to the transmitter. Assuming the current in the transmitting antenna coil remains constant, the magnitudes of the magnetic fields detected by the sensor when the system is operated in the first and second positions respectively are:

$$B_1 = \frac{Ka^2}{d^3} \cdot \frac{Ni_{tx} b^2}{d^3}$$

$$B_2 = \frac{Ka^2}{(d+s)^3} \cdot \frac{Ni_{tx} b^2}{(d+s)^3}$$

Where K is a constant of proportionality representing the re-radiation efficiency of the marker. Find the ratio R of the magnitudes of the magnetic fields detected by the magnetic sensor in the first and second positions, then solve for the depth d:

$$R = \frac{B_1}{B_2}$$

$$R = \frac{\frac{Ka^2}{d^3} \cdot \frac{Ni_{tx} b^2}{d^3}}{\frac{Ka^2}{(d+s)^3} \cdot \frac{Ni_{tx} b^2}{(d+s)^3}}$$

$$R = \frac{(d+s)^6}{d^6}$$

$$R = \left(\frac{d+s}{d}\right)^6$$

Solving for depth, d this gives:

$$d = \frac{s}{(R^{1/6}-1)}$$

The sensitivity of the depth estimation to errors in the measurement of the ratio R may be determined by finding the derivative of depth d with respect to ratio R. For the system above, this is given by:

$$S_1 = -\frac{1}{6} \cdot \frac{s}{\left[\left(R^{1/6} - 1\right)^2 \cdot R^{5/6}\right]}$$

As the depth equation contains an inverse sixth power, this system is highly sensitive to errors in determining R and suffers the disadvantage of requiring the user to lift the apparatus through a predefined distance s, introducing a further source of error.

SUMMARY OF INVENTION

According to a first aspect of the present invention a locator for determining the depth of a buried electromagnetic marker comprises a transmission antenna and two reception antennas. The locator has a major axis and is configured to be used with the major axis substantially perpendicular to a ground surface. The transmission antenna is configured to generate an oscillatory magnetic field parallel to the major axis. The first reception antenna of the two reception antennas is configured to couple with an oscillatory magnetic field parallel to the major axis emitted by the electromagnetic marker and to generate a first detected signal. The second reception antenna is displaced along the major axis from the first antenna and configured to couple with an oscillatory magnetic field parallel to the major axis emitted by the electromagnetic marker and to generate a second detected signal. The locator comprises analogue to digital converters which are configured to digitize the first and second detected signals and a processor which is configured to calculate the depth of the electromagnetic marker.

Because the first and second reception antennas are displaced from one another along the major axis, the magnitude of the magnetic field at two locations can be obtained without the need for the position of the locator to be changed. This provides an increased accuracy of depth calculation since the separation of the antennas is fixed and the user is not required to estimate the distance between positions for two readings.

Additionally, since both signals can be received as a result of the same transmission from the transmission antenna, there is no inaccuracy introduced from changes of the orientation of the transmission antenna relative to the electromagnetic marker between transmissions.

In an embodiment of the present invention, the transmission antenna comprises a winding around a transmission antenna axis and the transmission antenna axis is arranged to be substantially parallel to the major axis when the locator is in use; the first reception antenna comprises a winding around a first reception antenna axis and the first reception antenna axis is arranged to be substantially parallel to the major axis; and the second reception antenna comprises a winding around a second reception antenna axis, the second reception antenna axis is arranged to be substantially parallel to the major axis.

In an embodiment the transmission antenna axis is arranged to be within 5 degrees of parallel to the major axis when the locator is in use and/or the first reception antenna axis is arranged to be within 5 degree of parallel to the major axis, and/or the second reception antenna axis is arranged to be within 5 degrees of parallel to the major axis.

In an embodiment the transmission antenna axis is arranged to be within 2 degrees of parallel to the major axis when the locator is in use and/or the first reception antenna axis is arranged to be within 2 degree of parallel to the major axis, and/or the second reception antenna axis is arranged to be within 2 degrees of parallel to the major axis.

In an embodiment the locator further comprises a controller configured to cause the transmission antenna to generate an oscillatory magnetic field having a target frequency. The target frequency can be selected according to the type of utility associated with the marker balls being located. In an embodiment the target frequency is in the range 20 kHz to 200 kHz.

In an embodiment the controller is configured cause the transmission antenna to generate the oscillatory magnetic field having the target frequency for a first time interval and to prevent the first reception antenna from generating the first detected signal and the second reception antenna from generating the second detected signal for at least the first time interval.

As described above, the reception channels may be blanked when the transmission antenna is transmitting to the electromagnetic marker. This prevents the excitation signal transmitted from the transmission antenna from interfering with the signals from the electromagnetic marker detected by the reception antennas.

In an embodiment the locator is also operable to locate buried current carrying conductors such as cables and metallic pipes to which an alternating current has been applied. The location of the buried current carrying conductor may be realized using a third reception antenna. The controller may be configured to enable signals generated by the third reception antenna to be acquired and processed for a time interval excluding the first time interval.

In an embodiment the processor is configured to calculate the d depth of the electronic marker using the following equation:

$$d = \frac{s}{\left(R^{1/3} - 1\right)}$$

Where s is the separation of the first reception antenna and the second reception along the major axis and R is the ratio of the magnitudes of the first detected signal and the second detected signal.

In an embodiment the locator further comprises a display configured to display an indication of the calculated depth and the locator is configured such that the calculated depth is displayed on the display only when one or more predetermined criteria are satisfied.

In an embodiment the processor is configured to calculate the standard deviation of the depth calculation referred to in a 10 Hz bandwidth and a predetermined criterion is that the standard deviation of the depth calculation is less than 20%. Preferably, the predetermined criterion is that the standard deviation of the depth calculation is less than 15%, 10% or 5%. More preferably, the predetermined criterion is that the standard deviation of the depth calculation is less than 2% or 1%.

In an embodiment the processor is operable to calculate the first derivative with respect to time of the field detected at the antennas and a predetermined criterion is that the first derivative of the field detected at the antennas is less than 20% of the signal/s. Preferably, the predetermined criterion is that the first derivative of the field detected at the antennas is less than 15%, 10%, or 5% of the signal/s. More preferably, the predetermined criterion is that the first derivative of the field detected at the antennas is less than 2% or 1% of the signal/s.

In an embodiment the processor is further configured to calculate the first derivative with respect to time of the calculated depth and a predetermined criterion is that the first derivative of the calculated depth is less than 20% of the calculated depth/s.

Preferably, the predetermined criterion is that the first derivative of the calculated depth is less than 15%, 10%, or 5% of the calculated depth/s. More preferably, the predetermined criterion is that the first derivative of the calculated depth is less than 2% or 1% of the calculated depth/s.

In a second aspect of the present invention there is provided a method of determining the depth of a buried electromagnetic marker. The method comprises transmitting, from a transmission antenna of a locator, an oscillatory magnetic field to the electronic marker; receiving, at a first reception antenna of the locator, an oscillatory magnetic field emitted by the electronic marker and generating a first detected signal indicative of the strength of the oscillatory magnetic field emitted by the electronic marker at the first reception antenna; receiving, at a second reception antenna of the locator separated from the first reception antenna along a major axis of the locator, an oscillatory magnetic field emitted by the electronic marker and generating a second detected signal indicative of the strength of the oscillatory magnetic field emitted by the electronic marker at the second reception antenna; digitizing the first detected signal to generate a first digitized signal; digitizing the second detected signal to generate a second digitized signal; and calculating the depth of the electromagnetic marker from the first digitized signal and the second digitized signal.

In a third aspect of the present invention there is provided a carrier medium carrying computer readable instructions for execution by a processor in a locator, the locator having a major axis and being configured to be used with the major axis substantially perpendicular to a ground surface, the locator comprising a transmission antenna configured to generate an oscillatory magnetic field parallel to the major axis, a first reception antenna configured to couple with a oscillatory magnetic field parallel to the major axis emitted by the electromagnetic marker and to generate a first detected signal, a second reception antenna displaced along the major axis from the first antenna and configured to couple with a oscillatory magnetic field parallel to the major axis emitted by the electromagnetic marker and to generate a second detected signal, a first analogue to digital converter configured to generate a first digitized signal from the first detected signal, and a second analogue to digital converter configured to generate a second digitized signal from the second detected signal, wherein the instructions comprise instructions for controlling the processor to calculate a ratio of the magnitudes of the first detected signal and the second detected signal; and instructions for calculating the depth of the electronic marker from the ratio.

BRIEF DESCRIPTION OF THE DRAWINGS

In the following, embodiments of the invention will be described by way of example with reference to the accompanying drawings in which.

DETAILED DESCRIPTION

Figure 1:
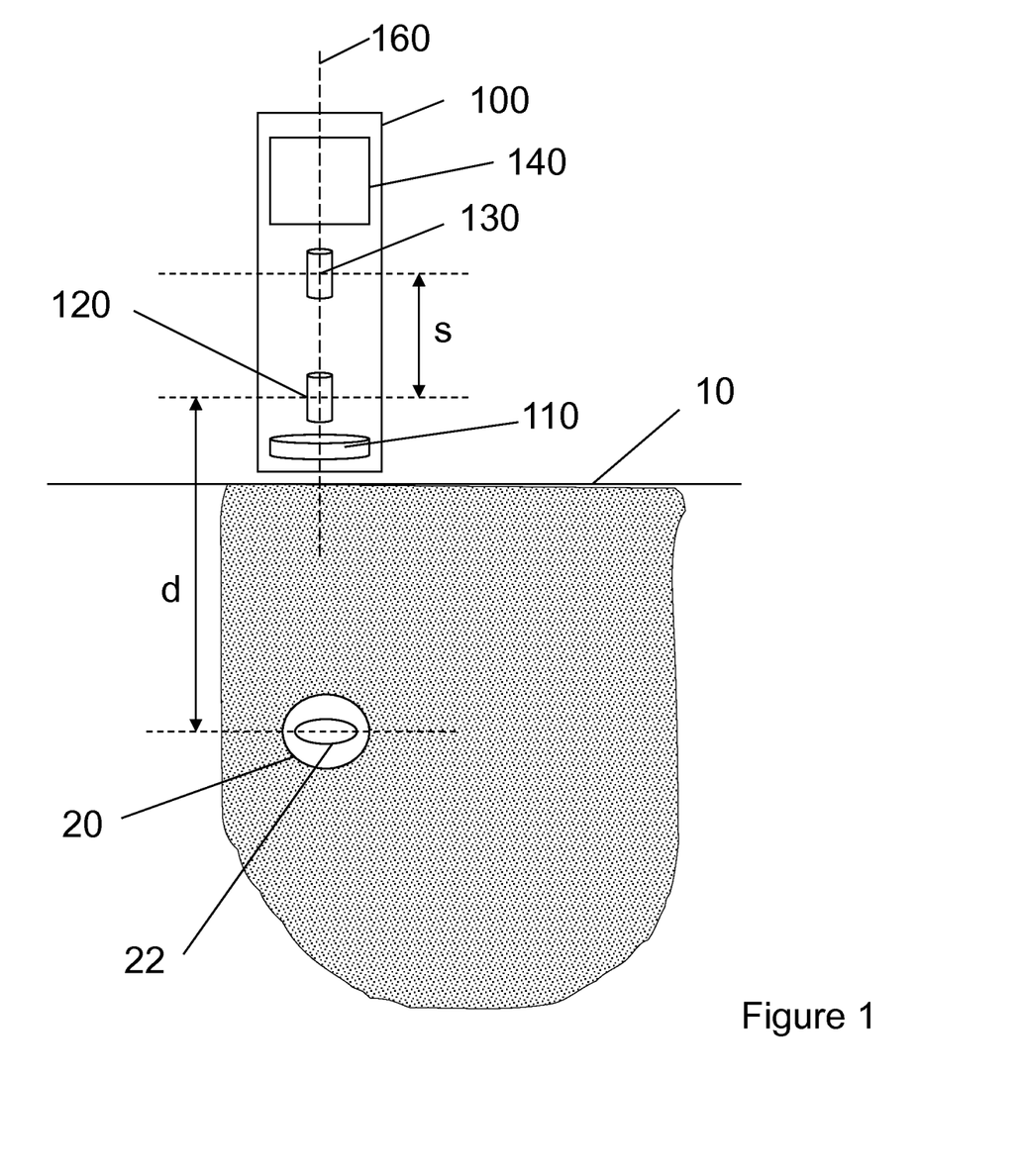
FIG. 1 shows a locator for calculating the depth of an electronic marker according to an embodiment of the present invention.

FIG. 1 shows an electronic marker locator 100 according to an embodiment. An electronic marker 20 is buried below ground level 10. The electronic marker 20 comprises a resonant circuit formed from a coil 22 and a capacitor. The electronic marker 20 has a resonant frequency, the value of which is dependent on the capacitance of the capacitor and the inductance of the coil 22.

The locator 100 comprises a transmission antenna 110, a first reception antenna 120 and a second reception antenna 130. The locator 100 has control and processing module 140 which controls the antennas and processes the signals received from the antennas. The control and processing module 140 is described in more detail with reference to FIG. 2 below.

The locator 100 has a major axis 160. The transmission antenna 110, the first reception antenna 120 and the second reception antenna 130 are arranged such that their magnetic axes are parallel to the major axis 160. As shown in FIG. 1, the locator is used with the major axis 160 perpendicular to the ground plane 10.

The second reception antenna 130 is separated from the first reception antenna 120 by a distance s along the major axis 160.

In use, the transmission antenna 110 transmits energy to the electronic marker 20 as an oscillating magnetic field. The frequency of the oscillating magnetic field is selected to match the resonant frequency of the resonant circuit in the electronic marker 20. After the transmission antenna 110 stops transmitting, the first reception antenna 120 and the second reception antenna 130 detect signals received from the electronic marker 20. From the ratio of the signal strengths and the known value s of the separation of the first reception antenna 120 and the second antenna 130 the depth d of the electronic marker 20 is calculated.

The magnetic flux density at a point on the axis of a circular coil consisting of N turns of radius a carrying current i at a distance x from the center of the coil may be determined using the Biot-Savart Law. It is given by:

$$B(x) = \frac{\mu_0 N i}{2}\left(\frac{a^2}{(x^2+a^2)^{\frac{3}{2}}}\right)$$

When x>>a, this simplifies to an inverse cube law:

$$B(x) = \frac{\mu_0 N i a^2}{2x^3}$$

Let the radius of the transmitting antenna be denoted b and the distance along the axis of the transmit antenna coil be x. The magnitude of the magnetic field at the center of the marker coil due to the ampere turns $Ni_{tx}$ in the transmit antenna coil is given by:

$$B_m(x) = \frac{\mu_0 N i_{tx}}{2} \left( \frac{b^2}{(x^2 + b^2)^{\frac{3}{2}}} \right)$$

When x>>b, this becomes:

$$B_m(x) = \frac{\mu_0 N i_{tx} b^2}{2x^3}$$

Assume the electronic marker has a circular coil of radius a. Let the distance along the axis of the circular coil from a first reception antenna to center of the circular coil=d. Let the distance along the axis of the circular coil from the transmitting antenna to center of the circular coil also be equal to d. The magnitudes of the magnetic fields detected by the first reception antenna and the second reception antenna respectively are:

$$B_1 = \frac{Ka^2}{d^3} \cdot \frac{N i_{tx} b^2}{d^3}$$

$$B_2 = \frac{Ka^2}{(d+s)^3} \cdot \frac{N i_{tx} b^2}{d^3}$$

Where K is a constant of proportionality representing the re-radiation efficiency of the marker. The ratio R of the magnitudes of the detected fields is given by $$R = \frac{B_1}{B_2}$$

$$R = \frac{\frac{Ka^2}{d^3} \cdot \frac{N i_{tx} b^2}{d^3}}{\frac{Ka^2}{(d+s)^3} \cdot \frac{N i_{tx} b^2}{d^3}}$$

$$R = \frac{(d+s)^3}{d^3}$$

$$R = \left(\frac{d+s}{d}\right)^3$$

Solving for d, we find the result:

$$d = \frac{s}{(R^{1/3} - 1)}$$

The magnitude of the magnetic field may be acquired simultaneously at the positions of the two magnetic sensors, so the system is unaffected by variations in the current in the transmitting antenna coil.

For the present system having two sensors the error sensitivity function is given by:

$$S_2 = -\frac{1}{3} \cdot \frac{s}{[(R^{1/3} - 1) \cdot R^{2/3}]}$$

For R>1.0 it can be shown that S1>S2, i.e. the depth estimation from a single antenna system is more sensitive to errors in measurement of the magnitude of the magnetic fields in the two positions than is the system having two magnetic sensors.

The system having two magnetic sensors requires calibration of the relative gains of the sensors; however the depth estimation for this system is significantly less sensitive to errors in the measurements of the magnitudes of the magnetic fields than the single sensor system.

The system having two reception antennas has the following advantages. There is no inconvenience to the user caused by having to move the sensor a predefined distance between measurements. In the single sensor system, having to move the system by a predefined distance introduces a possible error in distance s, which in turn introduces an error into the depth estimation. Further, in the single sensor system changes in axial alignment of the sensor between the two measurement positions result in error in R and hence lead to error in the depth estimation. Additionally, in the single sensor system the measurements are acquired at different times, so the system is susceptible to errors caused by variations in transmitter signal strength. The system with two reception antennas has a smaller sensitivity to errors in R which means a reduced susceptibility to errors due to noise in the magnetic measurements.

Therefore the embodiments of the present invention have many advantages over existing systems for estimating the distance to an electronic marker.

A correction may be applied to the depth calculation described above to account for the fact that in use, the first reception antenna 120 may be a distance above the ground surface. Such a correction would be based on the dimensions of the locator 100 and the configuration of the antennas within the locator 100.

Figure 2:
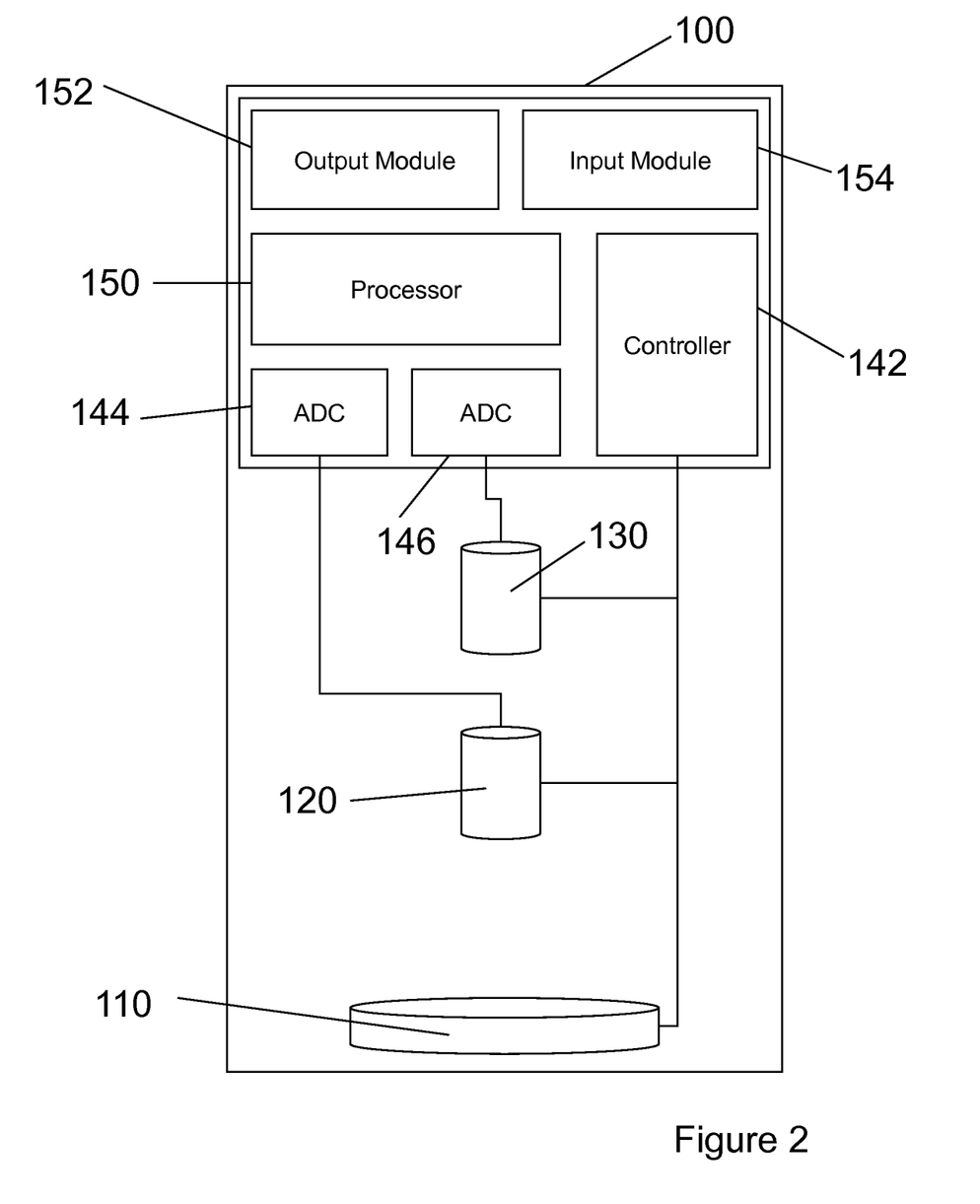
FIG. 2 shows a locator for calculating the depth of an electronic marker including details of the control and processing modules according to an embodiment of the present invention.

FIG. 2 shows an electronic marker locator 100 according to an embodiment of the present invention. FIG. 2 shows the control and processing module 140 in more detail. The control and processing module 140 comprises a controller 142, a first analogue to digital converter (ADC) 144, a second analogue to digital converter 146, a processor 150, an output module 152, and an input module 154.

The controller 142 is coupled to the transmit antenna 110, the first reception antenna 120 and the second reception antenna 130. The controller 142 is configured to cause the transmit antenna 110 to transmit an oscillating signal to the electronic marker. The controller 142 is also configured to switch the first reception antenna 120 and the second reception antenna 130 to a mode in which they do not produce an output signal in response to a magnetic field. The reception antennas are switched to this mode when the transmission antenna 110 is transmitting to the electronic marker so that the reception antennas do not directly detect the signal transmitted by the transmission antenna 110.

U.S. Pat. No. 6,617,856, the content of which is incorporated herein by reference, describes electronic marker locator system and method with one receive antenna. The processing associated with the signals from each of the reception antennas in the electronic marker locator 100 shown in FIG. 2 may be implemented as described in U.S. Pat. No. 6,617,856.

In an embodiment the controller 142 is configured to cause the transmission antenna 110 to transmit a sequence of pulses. While the transmission antenna 110 transmits the sequence of pulses, the reception antennas are switched to a mode in which they do not detect the pulses transmitted by the transmission antenna 110. After the sequence of pulses has been transmitted by the transmission antenna, the controller 142 switches the first reception antenna 120 and the second reception antenna 130 into a mode in which they are sensitive to magnetic signals transmitted from the electronic marker.

The first reception antenna 120 is connected to the first ADC 144. The First reception antenna 120 is configured to produce a first analogue signal in response to an oscillating magnetic field. The first ADC 144 is configured to digitize the first analogue signal and produce a first digital signal.

The second reception antenna 130 is connected to the second ADC 146. The second reception antenna 130 is configured to produce a second analogue signal in response to an oscillating magnetic field. The second ADC 146 is configured to digitize the second analogue signal and produce a second digital signal.

The processor 150 is configured to receive the first and second digital signals and to calculate an estimate of the depth of the electronic marker using the ratio of the magnitudes of the magnetic field detected by the first reception antenna 120 and the second reception antenna 130.

The output module 152 is coupled to a display which provides an indication of the calculated depth as a numeric value.

The input module 154 allows a user to input a selection of the type of marker to be located. The table below shows the resonant frequencies for markers associated with different types of utility.

| Application | Color | Frequency |
| --- | --- | --- |
| Power | Red | 169.8 kHz |
| Water | Blue | 145.7 kHz |
| Sanitary | Green | 122.5 kHz |
| Telephone | Orange | 101.4 kHz |
| Gas | Yellow | 83.0 kHz |
| Cable TV | Orange/Black | 77.0 kHz |

The input module 154 is configured to allow a user to select the frequency of the electronic markers being located.

In an embodiment, the processor and the controller are implemented as a single module.

Figure 3:
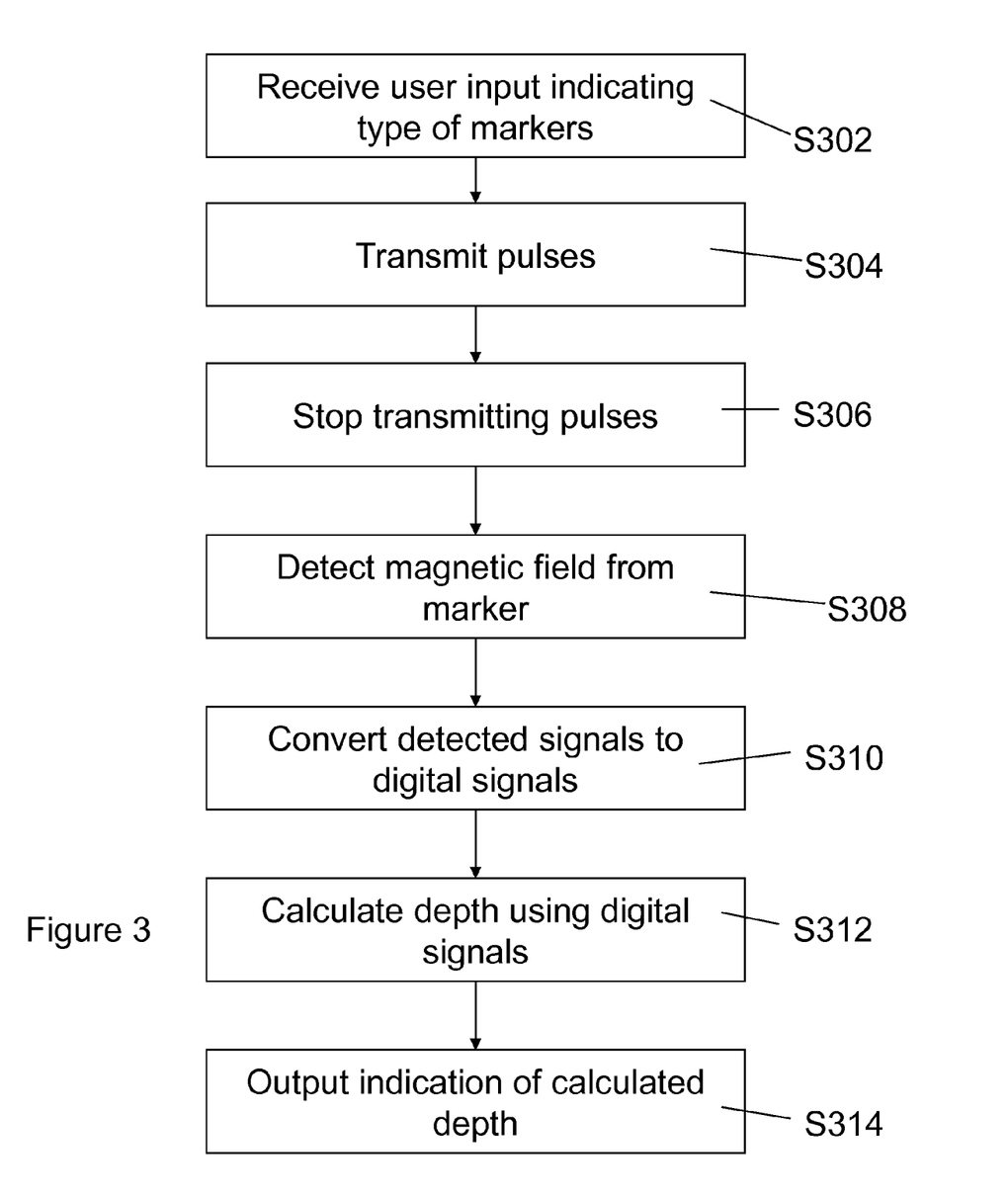
FIG. 3 shows a flowchart illustrating the steps in a method of calculating the depth of an electronic marker according to an embodiment of the present invention.

FIG. 3 is a flowchart showing a method carried out by a locator according to an embodiment of the present invention.

In step S302 a user input indicating the type of electronic markers to be located is received. In step S304, the controller causes the transmission antenna to transmit a pulse or a series of pulses having a frequency corresponding to the selected type of electronic markers. While the transmission antenna is transmitting, the reception antennas are switched to a mode in which they to do not output a signal. During step S304, if there is an electronic marker of the selected type below the locator, an oscillatory current at the resonant frequency of the marker will be induced in the marker.

In step S306, the controller causes the transmission antenna to stop transmitting. In step S308 the reception antennas are switched by the controller into a mode in which they can detect magnetic fields. The oscillatory current in the electronic marker decays and the electronic marker produces an oscillating magnetic field at its resonant frequency. The reception antennas detect the magnetic field produced by the electronic marker.

In step S310 the ADCs convert the analogue signals produced by the reception antennas into digital signals.

In step S312 the processor calculates the depth of the electronic marker from the ratio of the field strength detected by the first receive antenna and the field strength detected by the second receive antenna.

In step S314 the output module outputs an indication of the calculated depth.

In an embodiment the indication of the depth is output whenever a signal is detected from an electronic marker. In an alternative embodiment, the depth is calculated in response to a user interaction, for example in response to a user pressing a button on the locator. In such an embodiment, the output module may provide an indication of the signal strength received from the electronic marker. A user moves the locator over the ground surface and determines the point at which the signal strength received is a maximum. The indication provided to the user may be visual such as bar indicating the strength of the signal received, or an audio signal. When the indication indicates that the user is directly over the marker, the user may trigger the locator to calculate the depth of the marker.

In an alternative embodiment, the locator may determine a measure of the signal strength received from the marker and if the signal strength exceeds a maximum, provide the indication of depth to the user.

The display of the computed depth could be initiated whenever the rate of change of detected signal falls below a certain threshold, corresponding to the condition where the locator has stopped moving e.g. because the user has located a marker and is dwelling at that position in order to find the depth of the marker. Gating the display of computed depth based on rate of change of signal has the further benefit of suppressing the depth indication in noisy conditions, where the depth display would show a high degree of variation from one second to the next. This could be achieved by using the first derivative of the magnitude of the signals detected at the antennas, i.e., dU/dt to verify the integrity of the depth calculation This parameter ensures that the instrument is being held still at the time that the depth is calculated so that this parameter acts as an anti-ballistic filter. The first derivative of the magnitude of the detected signal should be less than 20% of the signal/s, preferably less than 15%, 10%, or 5% of the signal/s and more preferably less than 2%, or 1% of the signal/s.

In an alternative embodiment, the automatic display of depth could be initiated whenever the rate of change of computed depth signal falls below a certain threshold. The reasons and benefits are the same as the example above. The first derivative of the calculated depth should be less than 20% of the calculated depth/s, preferably less than 15%, 10%, or 5% of the calculated depth/s and more preferably less than 2%, or 1% of the calculated depth/s.

A further parameter that can be considered to verify the integrity of the depth calculation is the standard deviation of the depth calculation. This parameter indicates that the depth calculation is stable and not unduly fluctuating due to noise. The standard deviation of the depth calculation referred to a 10 Hz bandwidth should be less than 20%, preferably less than 15%, 10%, or 5% and more preferably less than 2% or 1%.

The parameters discussed above may be calculated by the processor between steps S312 and S314 described above in relation to FIG. 3.

Figure 4:
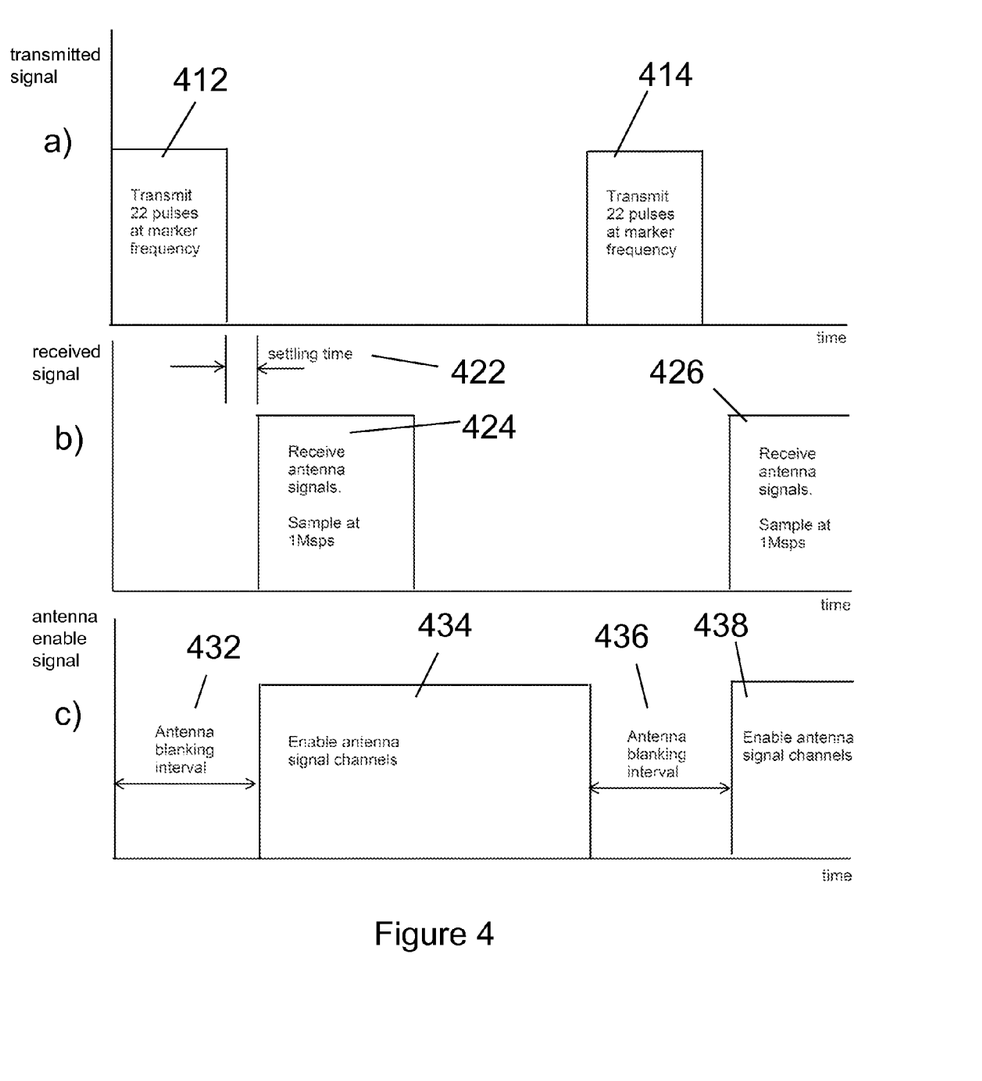
FIGS. 4a, 4b and 4c show the timing of transmission and reception of signals in a locator according to an embodiment of the present invention.

FIGS. 4a to 4c show the timing of the signals transmitted and received by the transmission antenna and the first and second receive antennas.

FIG. 4a shows the signals output by the transmission antenna. The controller controls the transmission antenna to transmit a first series 412 of pulses at the selected marker frequency. The first series 412 of pulses includes 22 pulses.

FIG. 4b shows the signals received by the first and second reception antennas. A settling time 422 is allowed to elapse before the first and second antennas are switched into a receive mode by the controller. Once the settling time 422 has elapsed, the first and second antennas receive antenna signals 424. The received signals are sampled at 1 Msps by the first and second ADCs.

In embodiments, the sampling rate of the ADC may be varied. The sampling rate of the ADC must be sufficient to meet the Nyquist sampling criterion but there is no upper limit other than the sample rate capability of the ADC and the processing capability and power consumption of the DSP versus the system power budget.

FIG. 4c shows the timing of the control of the reception antennas by the controller. The controller switches the antennas into a mode where signals are not detected for a first antenna blanking interval 432. The first antenna blanking interval comprises the time that the transmit antenna is transmitting the first series of pulses 412 and the settling time 422. Once the settling time has elapsed, the reception antenna channels are enabled for a first reception time period 434.

As can be seen from FIG. 4c, the first reception time period 434 extends beyond the time that the first and second antennas receive signals 424. During the additional time, the processing of the received signals may take place, and/or signals emitted from buried conductors may be detected and processed as discussed below.

At the end of the first reception time period 434, the next cycle begins. The controller causes the transmission antenna to transmit a second series of pulses 414. Then after a settling time has elapsed, the reception antennas receive the signals 426 transmitted by the electronic marker. The controller switches the reception antennas into a blanked mode during a second antenna blanking interval 436 while the transmission antenna is transmitting and during the settling period. Following the second antenna blanking interval 436, the receive antennas are enabled for a second reception time period 438.

The repetition rate of the transmit bursts is a parameter that is a trade-off between power consumption from the battery and the signal-to-noise ratio of the detected signal. Given the need to provide "real-time" operation to enable the user to sweep the Locator over an area of interest in search of buried markers, the optimum burst rate is typically between 100 and 1000 per second.

In the embodiment described above in relation to FIGS. 4a-c, the first and second series of pulses each include 22 pulses. The number of pulses in the series may be varied. The preferred range of numbers of pulses is related to the exponential time constant of the build-up of signal current in the marker in response to an applied magnetic field that is alternating at the resonant frequency of the marker. Too few pulses results in a weak return signal from the marker. Beyond a certain number of pulses there is little additional signal to be gained by adding more pulses. Adding more pulses is wasteful of battery power. The optimum number of pulses usually lies in the range from approximately 16 to 36 pulses.

In an embodiment the locator is also operable to locate buried conductors such as cables or pipes by detecting magnetic fields emitted by the buried conductor. The locator may have a dual locate mode in which information on the location of buried electronic markers and information on the location of buried conductors is provided to the user at the same time. In such a mode the receive antennas may be switched between a marker locate mode and a buried conductor locate mode by the controller. Alternatively, the two modes may operate concurrently, the antenna channel blanking described in relation to FIG. 4 eliminates interference that would otherwise occur to the buried conductor locate system due to the overloading of the antenna channels by the transmission of signals to the electronic markers.

Figures 5, 6:
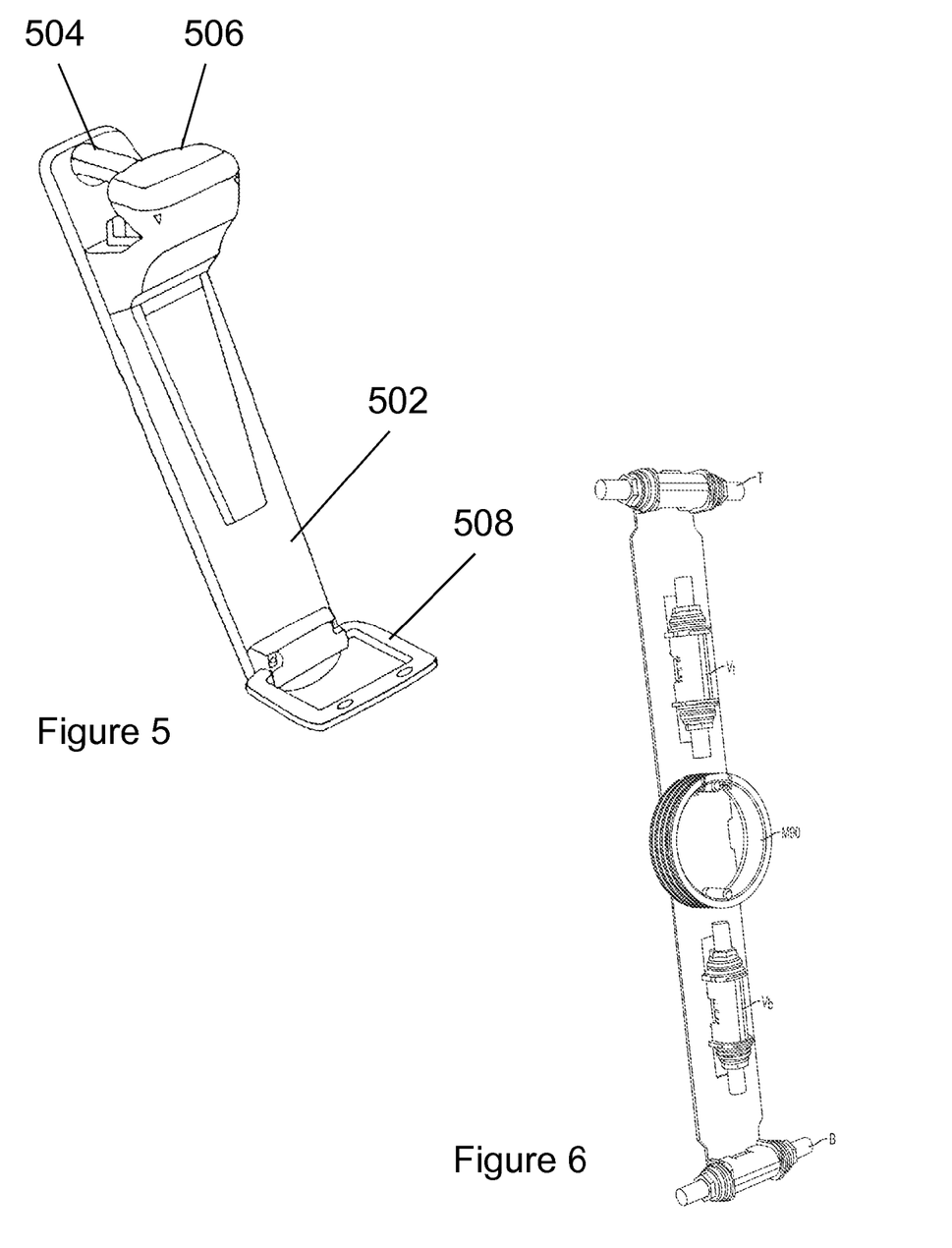
FIG. 5 shows a locator according to an embodiment of the present invention.
FIG. 6 shows reception antennas of a locator according to an embodiment of the present invention.

FIG. 5 shows a locator 500 according to an embodiment. The locator 500 is contained within a housing 502. The housing 502 has a handle 504 which is held by a user during use. Adjacent to the handle 504 is a display 506 which displays indications such as the depth of an electronic marker, the strength of signal received from an electronic marker, and information on the mode of the locator. If the locator is operating in a dual marker and buried conductor locate mode, the display may also display indications of depth and location for the buried conductor.

The housing 502 has a section extending from the handle 504 towards the ground when in use that is planar in cross section. The transmission antenna 508 is located at the opposite end of the housing from the handle 504 and is foldable from the housing. When in use, the transmission antenna 508 is folded to a position in which the windings of the antenna are parallel to the ground surface with the axis of the transmission antenna are perpendicular to the ground surface. This construction allows a transmission antenna of relatively large radius to be incorporated in the locator 500 while maintaining a thin profile. As can be seen from the equation given above for the magnetic flux density at a point on the axis of a circular loop, it is advantageous to incorporate a transmission antenna of large radius in the locator to maximize the magnetic flux at the cable.

FIG. 6 shows the layout of antennas on a printed circuit board within a locator according to an embodiment. FIG. 6 shows five antennas which are used to detect signals from emitted from a buried conductor. A first horizontal antenna T is located at the top of the printed circuit board. A first vertical antenna Vt is located below the first horizontal antenna T. A second horizontal antenna M90 is located below the first vertical antenna Vt. The second horizontal antenna M90 has is arranged with its axis perpendicular to the axis of the first horizontal antenna. A second vertical antenna Vb is located below the second horizontal antenna M90. A third horizontal antenna B is located at the bottom. The horizontal and vertical antennas are used to locate buried conductors, for example as described in United Kingdom Patent application number 1020666.2, the content which is incorporated herein by reference. The vertical antennas Vt and Vb are also used as the reception antennas for locating electronic markers in systems as described above. In such a system the transmission antenna may be foldable as described above in relation to FIG. 5.

While in FIG. 5 the transmission antenna is shown as being foldable, in an alternative embodiment, the transmission antenna may be fixed in position. Such alternative embodiments could use a transmit coil wound around a core of magnetically permeable material, such as a ferrite rod. The core acts to concentrate the magnetic flux, enabling the coil to be made smaller than an air cored antenna of equivalent capability. Such a transmit coil could be concealed inside the locator.

The digital domain signal processing described above may be implemented in FPGA, DSP or microcontroller devices, or split across some combination of the aforementioned devices.

Aspects of the present invention can be implemented in any convenient form, for example using dedicated hardware, or a mixture of dedicated hardware and software for the processing of the signals. The processing apparatuses can comprise any suitably programmed apparatuses such as a general purpose computer, personal digital assistant, mobile telephone (such as a WAP or 3G-compliant phone) and so on. Since the processing of the present invention can be implemented as software, each and every aspect of the present invention thus encompasses computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The present invention has been described above purely by way of example. Modifications in detail may be made to the embodiments within the scope of the claims appended hereto.

The invention claimed is:

1. A locator for determining a depth of a buried electromagnetic marker, the locator having a major axis and being configured to be used with the major axis substantially perpendicular to a ground surface, the locator comprising:
   a transmission antenna configured to generate an oscillatory magnetic field parallel to the major axis,
   a first reception antenna configured to couple with an oscillatory magnetic field parallel to the major axis emitted by the electromagnetic marker and to generate a first detected signal,
   a second reception antenna displaced along the major axis from the first antenna and configured to couple with an oscillatory magnetic field parallel to the major axis emitted by the electromagnetic marker and to generate a second detected signal,
   a first analogue to digital converter configured to generate a first digitised signal from the first detected signal,
   a second analogue to digital converter configured to generate a second digitised signal from the second detected signal, and
   a processor configured to calculate the depth of the electromagnetic marker from the first digitised signal and the second digitised signal,
   wherein the transmission antenna generates the oscillatory magnetic field having the target frequency for a first time interval and the first reception antenna is prevented from generating the first detected signal and the second reception antenna is prevented from generating the second detected signal for at least the first time interval.

2. A locator according to claim 1, wherein
   the transmission antenna comprises a winding around a transmission antenna axis, the transmission antenna axis arranged to be substantially parallel to the major axis when the locator is in use,
   the first reception antenna comprises a winding around a first reception antenna axis, the first reception antenna axis being arranged to be substantially parallel to the major axis, and
   the second reception antenna comprises a winding around a second reception antenna axis, the second reception antenna axis being arranged to be substantially parallel to the major axis.

3. A locator according to claim 2 wherein the transmission antenna axis is arranged to be within 5 degrees of parallel to the major axis when the locator is in use and/or the first reception antenna axis is arranged to be within 5 degree of parallel to the major axis, and/or the second reception antenna axis is arranged to be within 5 degrees of parallel to the major axis.

4. A locator according to claim 1, further comprising a controller configured to cause the transmission antenna to generate an oscillatory magnetic field having a target frequency.

5. A locator according to claim 4, wherein the controller is configured to select the target frequency from a plurality of possible target frequencies in accordance with a target marker type.

6. A locator according to claim 4 wherein the controller is configured cause the transmission antenna to generate the oscillatory magnetic field having the target frequency for a first time interval and to prevent the first reception antenna from generating the first detected signal and the second reception antenna from generating the second detected signal during a settling time after at least the first time interval.

7. A locator according to claim 6, further comprising a third reception antenna configured to couple with a magnetic field generated by a buried current carrying conductor, wherein the controller is configured to enable signals generated by the third reception antenna to be processed for a time interval excluding the first time interval.

8. A locator according to claim 1 wherein the processor is configured to calculate the d depth of the electronic marker using the following equation:

$$d = \frac{s}{\left(R^{1/3} - 1\right)}$$

where s is the separation of the first reception antenna and the second reception along the major axis and R is the ratio of the magnitudes of the first detected signal and the second detected signal.

9. A locator according to claim 1, further comprising a display configured to display an indication of a calculated depth, wherein the locator is configured such that the calculated depth is displayed on the display only when one or more predetermined criteria are satisfied.

10. A locator according to claim 9 wherein the processor is configured to calculate the standard deviation of the depth calculation referred to in a 10 Hz bandwidth and a predetermined criterion is that the standard deviation of the depth calculation is less than 20%.

11. A locator according to claim 10, wherein the processor is operable to calculate the first derivative with respect to time of the field detected at the antennas and a predetermined criterion is that the first derivative of the field detected at the antennas is less than 20% of the signal/s.

12. A locator according to claim 10, wherein the processor is further configured to calculate the first derivative with respect to time of the calculated depth and a predetermined criterion is that the first derivative of the calculated depth is less than 20% of the calculated depth/s.

13. A method of determining a depth of buried electromagnetic marker, the method comprising
   transmitting, from a transmission antenna of a locator, an oscillatory magnetic field to the electronic marker;
   receiving, at a first reception antenna of the locator, an oscillatory magnetic field emitted by the electronic marker and generating a first detected signal indicative of the strength of the oscillatory magnetic field emitted by the electronic marker at the first reception antenna;
   receiving, at a second reception antenna of the locator separated from the first reception antenna along a major axis of the locator, an oscillatory magnetic field emitted by the electronic marker and generating a second detected signal indicative of the strength of the oscillatory magnetic field emitted by the electronic marker at the second reception antenna;

preventing the first reception antenna from generating the first detected signal and the second reception antenna from generating the second detected signal while the oscillatory magnetic field is transmitted from the transmission antenna to the electronic marker;

digitising the first detected signal to generate a first digitised signal;

digitising the second detected signal to generate a second digitised signal; and calculating the depth of the electromagnetic marker from the first digitised signal and the second digitised signal.

14. A method according to claim 13, further comprising preventing the first reception antenna from generating the first detected signal and the second reception antenna from generating the second detected signal during a settling time after the oscillatory magnetic field is transmitted from the transmission antenna to the electronic marker.

15. A method according to claim 13 wherein calculating the depth of the electronic marker comprises calculating the depth d as:

$$d = \frac{s}{\left(R^{1/3} - 1\right)}$$

where s is the separation of the first reception antenna and the second reception along the major axis and R is the ratio of the magnitudes of the first detected signal and the second detected signal.

16. A method according to claim 13, further comprising determining if one or more predetermined criteria are satisfied and if one or more predetermined criteria are satisfied displaying an indication of a calculated depth.

17. A method according to claim 16, further comprising calculating the standard deviation of the depth calculation referred to in a 10 Hz bandwidth and wherein a predetermined criterion is that the standard deviation of the depth calculation is less than 20%.

18. A method according to claim 16, further comprising calculating the first derivative with respect to time of the field detected at the reception antennas and a predetermined criterion is that the first derivative of the field detected at the reception antennas is less than 20% of the signal/s.

19. A method according to claim 16, further comprising calculating the first derivative with respect to time of the calculated depth and a predetermined criterion is that the first derivative of the calculated depth is less than 20% of the calculated depth/s.

20. A tangible non-transitory carrier medium carrying computer readable instructions for execution by a processor in a locator, the locator having a major axis and being configured to be used with the major axis substantially perpendicular to a ground surface, the locator comprising a transmission antenna configured to generate an oscillatory magnetic field parallel to the major axis, a first reception antenna configured to couple with a oscillatory magnetic field parallel to the major axis emitted by the electromagnetic marker and to generate a first detected signal, a second reception antenna displaced along the major axis from the first antenna and configured to couple with a oscillatory magnetic field parallel to the major axis emitted by the electromagnetic marker and to generate a second detected signal, a first analogue to digital converter configured to generate a first digitised signal from the first detected signal, and a second analogue to digital converter configured to generate a second digitised signal from the second detected signal, wherein the instructions comprise:

instructions for preventing the first reception antenna from generating the first detected signal and the second reception antenna from generating the second detected signal while the oscillatory magnetic field is transmitted from the transmission antenna;

instructions for controlling the processor to calculate a ratio of the magnitudes of the first detected signal and the second detected signal; and instructions for calculating the depth of the electronic marker from the ratio.

* * * * *

UNITED STATES PATENT AND TRADEMARK OFFICE
CERTIFICATE OF CORRECTION

PATENT NO. : 9,194,978 B2
APPLICATION NO. : 13/892841
DATED : November 24, 2015
INVENTOR(S) : Richard David Pearson et al.

It is certified that error appears in the above-identified patent and that said Letters Patent is hereby corrected as shown below:

In the claims:
Claim 1, line 12, (Column 13) replace "an" with --the--.
Claim 1, line 25, (Column 13) replace "the" with --a--.
Claim 4, line 3, (Column 13) replace "an" with --the--.
Claim 4, line 3, (Column 13) replace "a" with --the--.
Claim 6, line 2, (Column 14) after "configured" insert --to--.
Claim 8, line 6, (Column 14, line 29) replace "the", third occurrence, with --a--.
Claim 8, line 7, (Column 14, line 30) delete "the", first occurrence.
Claim 10, line 2, (Column 14) replace "the", first occurrence, with --a--.
Claim 11, line 2, (Column 14) replace "the" with --a--.
Claim 12, line 2, (Column 14) replace "the" with --a--.
Claim 13, lines 1-2, (Column 14) replace "electromagnetic" with --electronic--.
Claim 13, line 8, (Column 14) replace "the", first occurrence, with --a--.
Claim 13, line 12, (Column 14) replace "an" with --the--.
Claim 13, line 26, (Column 15, line 11) replace "electromagnetic" with --electronic--.
Claim 15, line 6, (Column 15, line 28) replace "the", third occurrence, with --a--.
Claim 15, line 7, (Column 15, line 29) delete "the", first occurrence.
Claim 17, line 2, (Column 15) replace "the", first occurrence, with --a--.
Claim 18, line 2, (Column 16) replace "the", first occurrence, with --a--.
Claim 19, line 2, (Column 16) replace "the", first occurrence, with --a--.
Claim 20, line 12, (Column 16) replace "a" with --the--.
Claim 20, line 26, (Column 16) delete "the", first occurrence.
Claim 20, line 28, (Column 16) replace "the", first occurrence, with --a--.
Claim 20, line 28, (Column 16) replace "electronic" with --electromagnetic--.

Signed and Sealed this
Twenty-third Day of August, 2016

Michelle K. Lee
*Director of the United States Patent and Trademark Office*